(12) United States Patent
Fleischer et al.

(10) Patent No.: US 12,182,576 B2
(45) Date of Patent: *Dec. 31, 2024

(54) EXECUTING A COMPOSITE SCALAR-VECTOR VLIW INSTRUCTION HAVING A REPEAT FIELD

(71) Applicant: International Business Machines Corporation, Armonk, NY (US)

(72) Inventors: Bruce M. Fleischer, Bedford Hills, NY (US); Thomas Winters Fox, Hopewell Junction, NY (US); Arpith C. Jacob, Dobbs Ferry, NY (US); Hans Mikael Jacobson, White Plains, NY (US); Ravi Nair, Briarcliff Manor, NY (US); Kevin John Patrick O'Brien, South Salem, NY (US); Daniel Arthur Prener, Croton-on-Hudson, NY (US)

(73) Assignee: International Business Machines Corporation, Armonk, NY (US)

( * ) Notice: Subject to any disclaimer, the term of this patent is extended or adjusted under 35 U.S.C. 154(b) by 354 days.

This patent is subject to a terminal disclaimer.

(21) Appl. No.: 16/731,214

(22) Filed: Dec. 31, 2019

(65) Prior Publication Data

US 2020/0142704 A1    May 7, 2020

Related U.S. Application Data

(63) Continuation of application No. 15/086,947, filed on Mar. 31, 2016, now Pat. No. 10,572,263.

(51) Int. Cl.
  *G06F 9/38* (2018.01)
  *G06F 9/30* (2018.01)

(52) U.S. Cl.
  CPC ........ *G06F 9/3853* (2013.01); *G06F 9/30065* (2013.01); *G06F 9/3836* (2013.01)

(58) Field of Classification Search
  CPC ... G06F 9/30065; G06F 9/3836; G06F 9/3853
  See application file for complete search history.

(56) References Cited

U.S. PATENT DOCUMENTS

| | | | |
|---|---|---|---|
| 5,794,029 A | 8/1998 | Babaian et al. | |
| 6,366,998 B1 | 4/2002 | Mohamed | |
| 7,370,136 B2 | 5/2008 | Dash | |
| 7,676,647 B2 | 3/2010 | Codrescu et al. | |
| 9,280,344 B2 | 3/2016 | Diewald | |
| 10,572,263 B2 * | 2/2020 | Fleischer | ............ G06F 9/3853 |
| 2003/0110201 A1 | 6/2003 | Tanaka | |
| 2003/0177315 A1 | 9/2003 | Hooker | |

(Continued)

OTHER PUBLICATIONS

Soliman, "A VLIW Architecture for Executing Multi-Scalar/Vector Instructions on Unified Datapath", IEEE, 2013, 7 pages.*

(Continued)

*Primary Examiner* — David J. Huisman
(74) *Attorney, Agent, or Firm* — Caleb D. Wilkes

(57) ABSTRACT

A processor core includes a storage device which stores a composite very large instruction word (VLIW) instruction, an instruction unit which obtains the composite VLIW instruction from the storage device and decodes the composite VLIW instruction to determine an operation to perform, and a composite VLIW instruction execution unit which executes the composite VLIW instruction to perform the operation.

19 Claims, 13 Drawing Sheets

(56) References Cited

U.S. PATENT DOCUMENTS

| | | | |
|---|---|---|---|
| 2004/0019762 A1* | 1/2004 | Fukuoka | G06F 12/1027 |
| | | | 711/207 |
| 2004/0073776 A1* | 4/2004 | Hussain | G06F 9/3853 |
| | | | 712/215 |
| 2005/0066079 A1* | 3/2005 | Luick | G06F 11/2051 |
| | | | 710/36 |
| 2005/0240644 A1 | 10/2005 | Van Berkel | |
| 2005/0273582 A1 | 12/2005 | Wilson | |
| 2011/0161630 A1* | 6/2011 | Raasch | G06F 9/30196 |
| | | | 712/205 |

OTHER PUBLICATIONS

Callahan et al., "The Garp architecture and C compiler." Computer 33.4 (2000): 62-69.

Wittenburg et al. "HiPAR-DSP: A parallel VLIW RISC processor for real time image processing applications." Algorithms and Architectures for Parallel Processing, 1997. ICAPP 97., 1997 3rd International Conference on. IEEE, 1997, pp. 155-162.

Wolfe, et al., "A Variable Instruction Stream Extension to the VLIW Architecture", ACM SIGARCH Computer Architecture News 19.2 (1991): 2-14.

IBM: List of IBM Patents or Patent Applications Treated as Related. Filed Herewith. 2 pages.

\* cited by examiner

EXECUTING A COMPOSITE SCALAR-VECTOR VLIW INSTRUCTION HAVING A REPEAT FIELD

The present application is a Continuation Application of U.S. patent application Ser. No. 15/086,947, which was filed on Mar. 31, 2016.

GOVERNMENT RIGHTS

This invention was made with Government support under Contract No. B599858 awarded by the Department of Energy. The Government has certain rights in this invention.

BACKGROUND OF THE INVENTION

Field of the Invention

The present invention relates to a processor core, processor and method for executing a composite very large instruction word (VLIW) instruction and, more particularly, a processor core, processor and method for executing a composite scalar-vector VLIW instruction which is a variable iteration instruction.

Description of the Related Art

A related art processor core may include one or more functional units, such as a branch and control unit, an integer arithmetic unit, a floating point unit a load/store unit, a divide unit and a crypto unit. The functional units in the processor core operate synchronously (in lock step), and are programmed by feeding the functional units an instruction (hereafter called atom) with operands.

The operands may be scalar or vector. An atom that has scalar operands only is a Scalar Atom, otherwise it is a Vector Atom.

A Very Large Instruction Word (VLIW) is a single instruction containing the atoms (e.g., instructions) for one or more of the functional units of the processor core. A VLIW instruction, has a "repeat" field (REP), which specifies the number of times the instruction is to be executed. If the repeat count is >1 and an operand is a vector, then the operation is executed on multiple elements of the vector. An atom is said to execute for REP iterations.

FIG. 1 illustrates a VLIW instruction 100, according to the related art.

As illustrated in FIG. 1, the VLIW instruction 100 includes a repeat field (REP). The VLIW instruction 100 also includes four atoms (e.g., instructions) which are given as Operation 1 to be performed by the control unit of the processor core, Operations 2 and 3 which are to be performed by arithmetic logic units ALU1 and ALU2 of the processor core, respectively, and Operation 4 which is to be performed by a load/store unit of the processor core.

It should be noted that VLIW instructions (such as VLIW instruction 100) may be created by a programmer or by a compiler.

FIG. 2 illustrates a scalar VLIW instruction 200, according to the related art.

As illustrated in FIG. 2, the scalar VLIW instruction 200 includes a no-operation instruction (NOP) which is ignored by the designated functional unit (in this case, the control unit). The scalar VLIW instruction 200 also includes SCALAR_OP1 and SCALAR_OP2 (operations on scalar operands) which are to be performed by ALU1 and ALU2, respectively, and SCALAR_OP3 (an operation on a scalar operand) which is to be performed by the load/store unit of the processor core. Further, the scalar VLIW instruction 200 includes a repeat field of 1. Thus, the scalar VLIW instruction 200 is executed for exactly one iteration.

It should be noted that the operations to be executed in the VLIW instruction 100 (e.g., SCALAR_OP1, SCALAR_OP2 and SCALAR_OP3) may be executed in parallel.

FIG. 3 illustrates a vector VLIW instruction 300, according to the related art.

As illustrated in FIG. 3, the vector VLIW instruction 300 includes a no-operation instruction (NOP) which is ignored by the designated functional unit (in this case, the control unit). The vector VLIW instruction 300 also includes VECTOR_OP1 and VECTOR_OP2 (operations on vector operands) which are to be performed by ALU1 and ALU2, respectively, and VECTOR_OP3 (an operation on a vector operand) which is to be performed by the load/store unit of the processor core.

Further, the vector VLIW instruction 300 includes a repeat field of 32. Thus, the vector VLIW instruction 300 is executed for exactly 32 iterations.

SUMMARY OF THE INVENTION

In view of the foregoing and other problems, disadvantages, and drawbacks of the aforementioned conventional processor cores, processors and methods, an exemplary aspect of the present invention is directed to a processor core, processor, method of generating a composite VLIW instruction and method for executing a composite VLIW instruction which are more effective and more efficient than conventional processor cores, processors and methods.

An exemplary aspect of the present invention is directed to a processor core which includes a storage device which stores a composite very large instruction word (VLIW) instruction, an instruction unit which obtains the composite VLIW instruction from the storage device and decodes the composite VLIW instruction to determine an operation to perform, and a composite VLIW instruction execution unit which executes the decoded composite VLIW instruction to perform the operation.

Another exemplary aspect of the present invention is directed to a method of executing a composite very large instruction word (VLIW) instruction, the method including storing the composite VLIW instruction, obtaining the composite VLIW instruction, and decoding the composite VLIW instruction to determine an operation to perform, and executing the decoded composite VLIW instruction to perform the operation.

Another exemplary aspect of the present invention is directed to a method of generating a composite very large instruction word (VLIW) instruction, including inserting a scalar atom in the composite VLIW instruction to be executed at a single iteration, inserting a vector atom in the composite VLIW instruction to be executed during all iterations indicated in the REPEAT field of the composite VLIW instruction, and inserting branch and control atoms in the composite VLIW instruction to be executed at a single iteration.

Another exemplary aspect of the present invention is directed to a programmable storage medium tangibly embodying a program of machine-readable instructions executable by a digital processing apparatus to perform the method of executing a composite very large instruction word (VLIW) instruction of the present invention.

With its unique and novel features, the present invention provides a processor core, processor, method for generating a composite VLIW instruction, and method of executing a composite VLIW instruction which are more effective and more efficient than conventional processor cores, processors and methods.

BRIEF DESCRIPTION OF THE DRAWINGS

The foregoing and other objects, aspects and advantages will be better understood from the following detailed description of the embodiments of the invention with reference to the drawings, in which.

DETAILED DESCRIPTION OF THE EXEMPLARY EMBODIMENTS OF THE INVENTION

Figure 1:
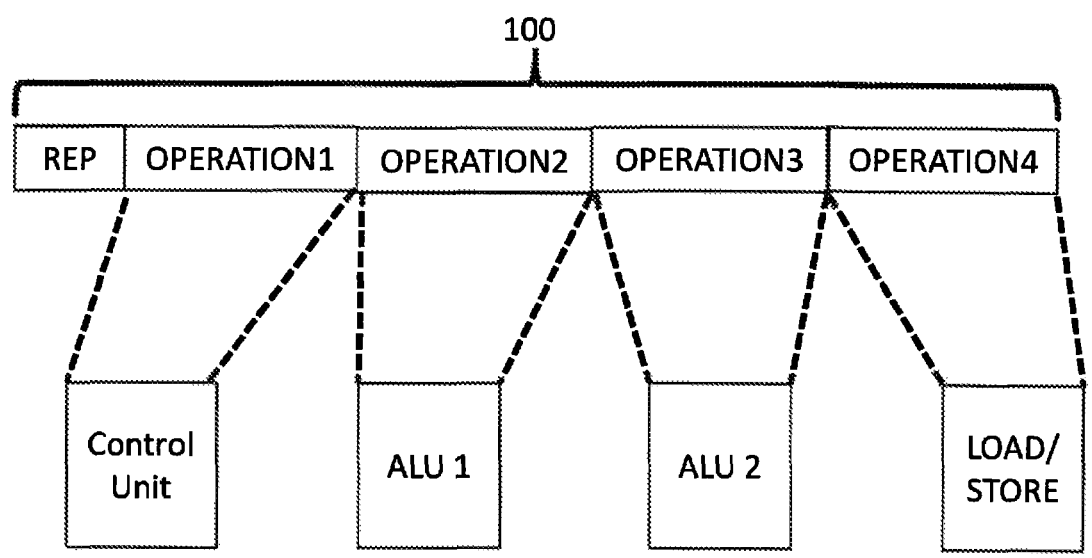
FIG. 1 illustrates a VLIW instruction 100, according to the related art.
Figure 2:
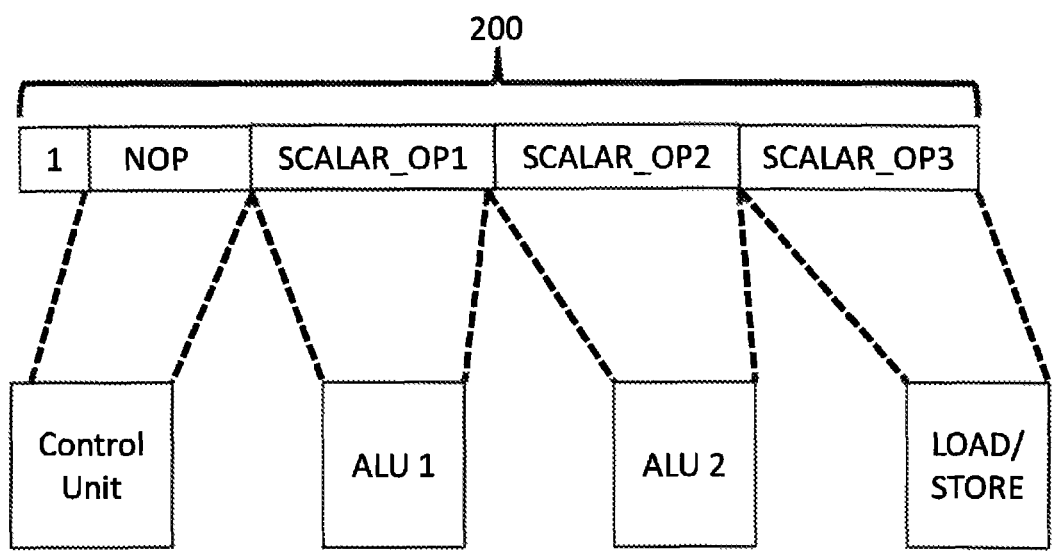
FIG. 2 illustrates a scalar VLIW instruction 200, according to the related art.
Figure 3:
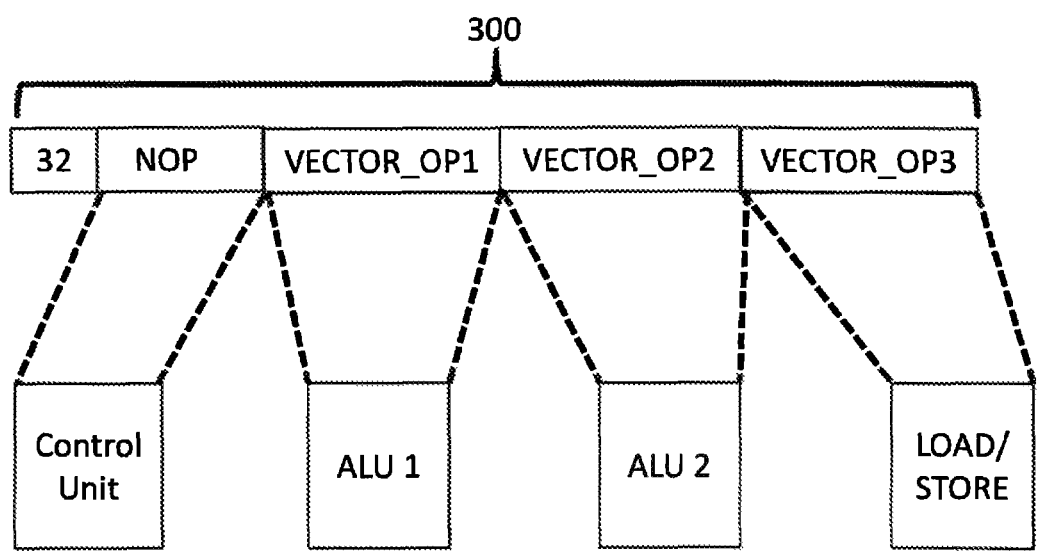
FIG. 3 illustrates a vector VLIW instruction 300, according to the related art.

Referring now to the drawings, FIGS. 4-6 and 9-13 illustrate the exemplary aspects of the present invention.

Figure 4:
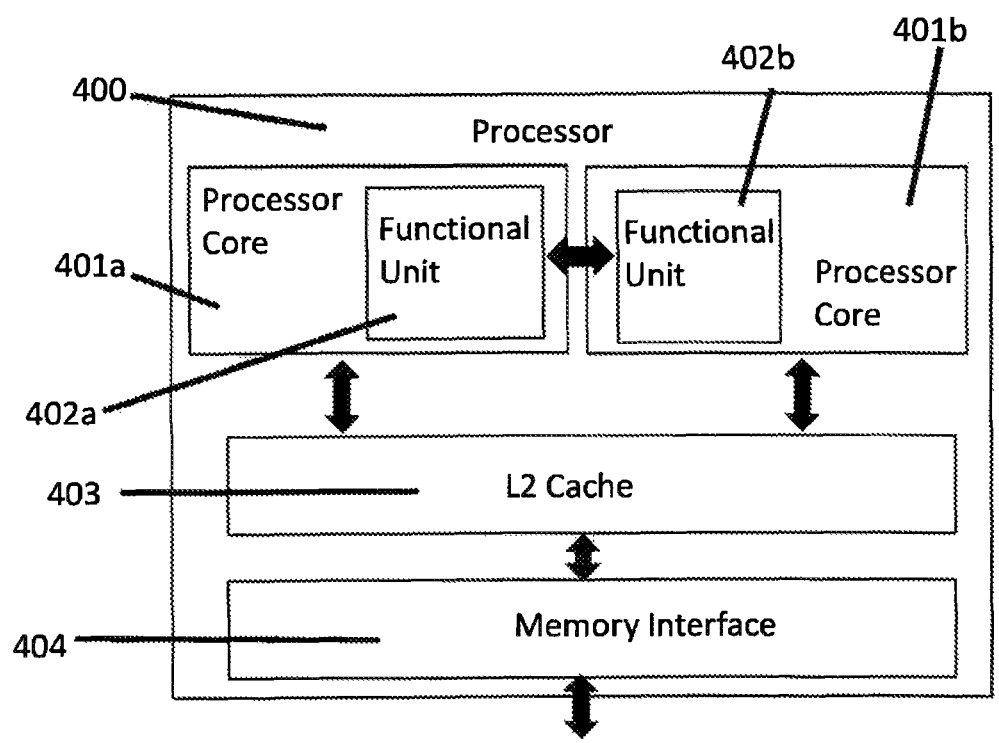
FIG. 4 illustrates a processor 400 (e.g., an integrated circuit chip having multiple processor cores), according to an exemplary aspect of the present invention.

FIG. 4 illustrates a processor 400 (e.g., an integrated circuit chip having multiple processor cores) according to an exemplary aspect of the present invention. The processor 400 may execute a composite scalar-vector VLIW instruction (e.g., a variable iteration instruction).

The term "composite scalar-vector VLIW instruction" (also referred to as a "composite VLIW instruction") should be construed to mean a VLIW instruction which includes at least one scalar instruction (e.g., scalar atom) and at least one vector instruction (e.g., vector atom).

As illustrated in FIG. 4, the processor 400 includes processor cores 401a and 401b which may be identical. The processor cores 401a and 401b each include one or more respective shareable functional units 402a, 402b. By "shareable" it is meant that processor core 401a may access functional unit 402b (e.g., if functional unit 402a becomes disabled), and processor core 401b may access functional unit 402a (e.g., if functional unit 402b becomes disabled).

The functional units 402a, 402b may include, for example, a floating point unit (e.g., a pipeline which performs floating point operations on data), a branch and control unit, an integer arithmetic unit, a load/store unit, a divide unit or a crypto unit.

The processor 400 also includes Level 2 Cache 403 which is coupled to the processor cores 401a, 401b and stores both instructions and non-instruction data, and memory interface 404 which is coupled to the Level 2 Cache 403 and loads data from or stores data to an external (i.e., off chip) memory location, which is generally a main memory, although it could be another level of Cache.

Figure 5:
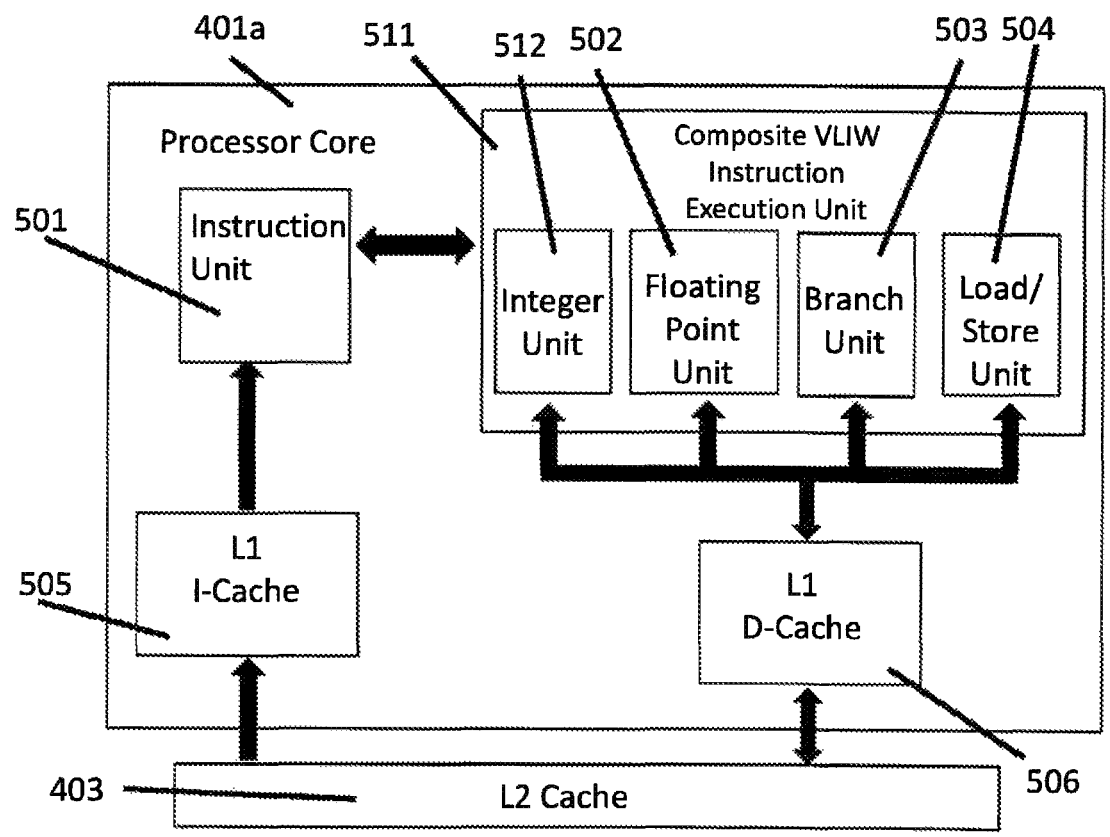
FIG. 5 illustrates the processor core 401a, according to an exemplary aspect of the present invention.

FIG. 5 illustrates the processor core 401a, according to an exemplary aspect of the present invention. The processor core 401a may execute a composite VLIW instruction (e.g., a variable iteration instruction).

As illustrated in FIG. 5, the processor core 401a includes an instruction unit 501, a composite VLIW instruction execution unit 511, a Level 1 Instruction Cache (L1 I-Cache) 505 and a Level 1 Data Cache (L1 D-Cache) 506. The instruction unit 501 obtains instructions from L1 I-cache 505, decodes the instructions to determine the operations to perform, and resolves branch conditions to control program flow.

The composite VLIW instruction execution unit 511 includes a floating point unit 502 (i.e., corresponding to the functional unit 402a) for performing floating point operations. The floating point unit 502 may include, for example, a set of floating point registers and a floating point multiply/add (MADD) pipeline.

The composite VLIW instruction execution unit 511 also includes an integer unit 512 which may include, for example, a set of general purpose registers for storing data and an integer arithmetic logic unit (ALU) for performing arithmetic and logical operations on data in the general purpose registers, responsive to instructions (e.g., VLIW instructions and composite VLIW instructions) decoded by instruction unit 501.

As illustrated in FIG. 5, the composite VLIW instruction execution unit 511 may also include a Branch Unit 503 and a Load/Store Unit 504.

The composite VLIW instruction execution unit 511 loads or stores data from the L1 D-Cache 506, and performs arithmetic and logical operations on the data in the general purpose and floating point registers. The L1 I-Cache 505 and L1 D-Cache 506 obtain data from (and, in the case of L1 D-Cache, store data to) the shared Level 2 Cache 403.

Figure 6:
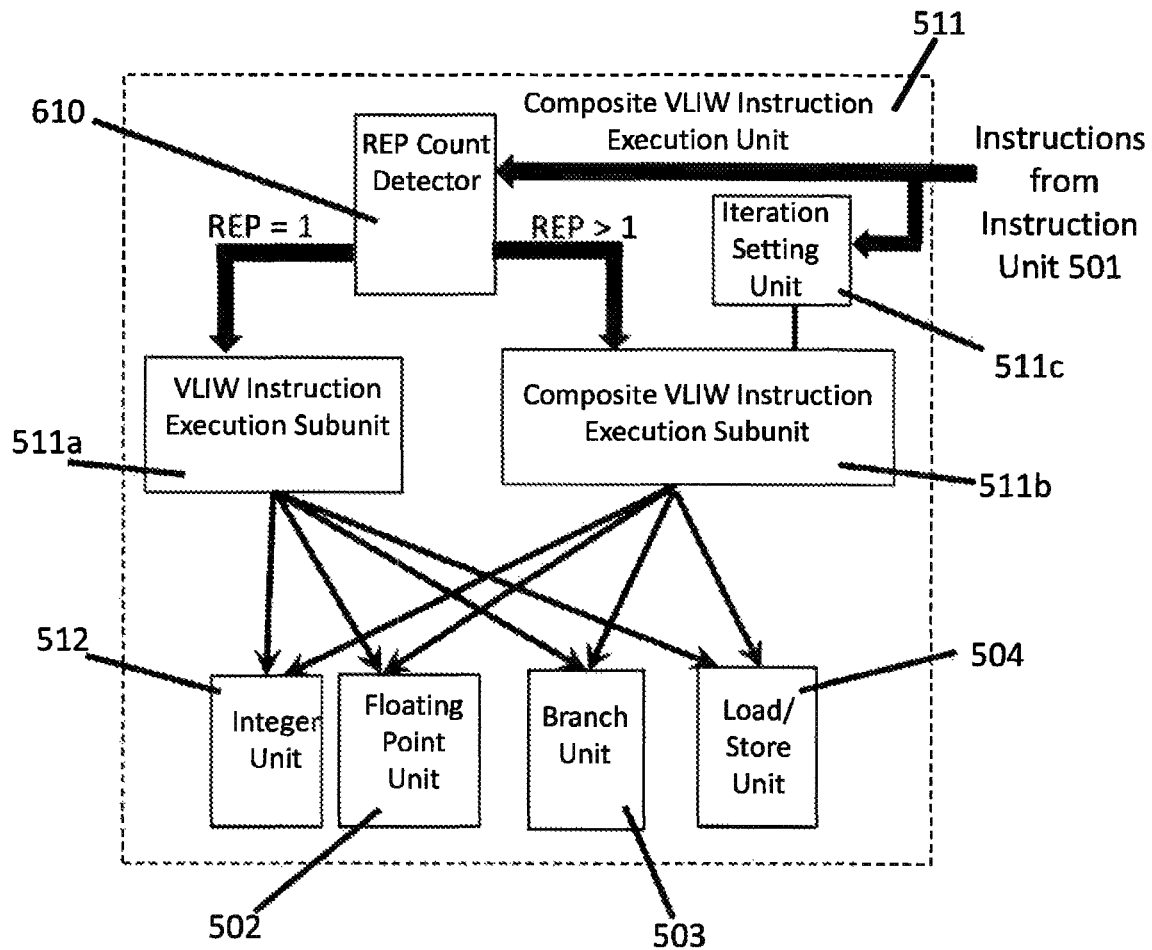
FIG. 6 illustrates the composite VLIW instruction execution unit 511, according to an exemplary aspect of the present invention.

FIG. 6 illustrates the composite VLIW instruction execution unit 511, according to an exemplary aspect of the present invention. The composite VLIW instruction execution unit 511 may execute a composite VLIW instruction (e.g., a variable iteration instruction).

As illustrated in FIG. 6, the composite VLIW instruction execution unit 511 may include a REP Count Detector 610 which receives instructions (e.g., VLIW instructions) from the Instruction Unit 501. If the REP Count Detector 610 detects a REP=1 field in a VLIW instruction, then the VLIW instruction is executed by the VLIW instruction Execution Subunit 511a, which directs the functional units (e.g., Integer Unit 512, Floating Point Unit 502, Branch Unit 503 and Load/Store Unit 504) to perform a single iteration.

If the REP Count Detector 610 detects a REP>1 field in a VLIW instruction, then the VLIW instruction is executed by the composite VLIW instruction Execution Subunit 511b, which directs the functional units (e.g., Integer Unit 512, Floating Point Unit 502, Branch Unit 503 and Load/Store Unit 504) to perform the number of iterations as indicated in the REP field.

It should be noted that although the exemplary embodiment in FIG. 6 includes an REP Count Detector 610, the present invention does not necessarily need to detect an REP count (e.g., REP=1 and REP>1). For example, a VLIW instruction with REP=1 may be input to VLIW Instruction Execution Subunit 511*a* and a VLIW instruction with REP>1 may be input to Composite VLIW Instruction Execution Subunit 511*b*, without detection by the Composite VLIW Instruction Execution Unit 511.

An operation of the composite VLIW instruction execution unit 511 will now be described in greater detail.

Figure 7:
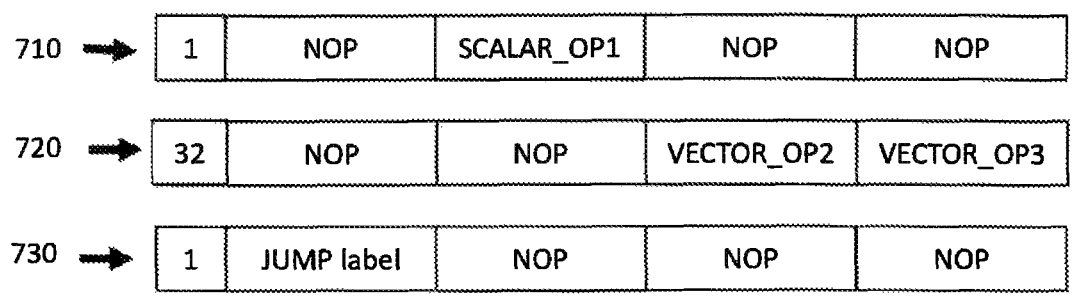
FIG. 7 illustrates three VLIW instructions including a scalar VLIW instruction 710, a vector VLIW instruction 720 and a control VLIW instruction 730 which are included in a program (e.g., a software program), according to the related art.

FIG. 7 illustrates three VLIW instructions including a scalar VLIW instruction 710, a vector VLIW instruction 720 and a control VLIW instruction 730 which are included in a program (e.g., a software program), according to the related art. Conventionally, a scalar atom and a vector atom cannot be combined in the same VLIW instruction, since the repeat field (REP) is applied to every atom in the VLIW instruction.

Therefore, as illustrated in FIG. 7, when a program has a mix of scalar and vector atoms, a large number of VLIW instructions may be required for correct representation. That is, a VLIW instruction with a REP count of 1 (e.g., VLIW instruction 710) is required for the scalar atoms, and a VLIW instruction with a REP count>1 (e.g., VLIW instruction 720) is required for vector atoms.

Such a growth of the number of VLIW instructions leads to a waste of data transfer bandwidth and can also lead to an overflow of the instruction buffer. The numerous VLIW instructions can also require more cycles (e.g., operation cycles) to execute the VLIW instructions.

For example, in FIG. 7, to represent the four atoms (i.e., SCALAR_OP1, VECTOR_OP2, VECTOR_OP3, and JUMP label), three VLIW instructions (710, 720 and 730) are required. In addition, it takes 34 (1+32+1) processor cycles to execute the four atoms. In fact, 8 out of 12 atoms in the VLIW instructions are NOPs that have to be maintained as overhead. Thus, conventional execution units are very inefficient in executing VLIW instructions in a program which includes a mix of scalar and vector atoms.

Figure 8:
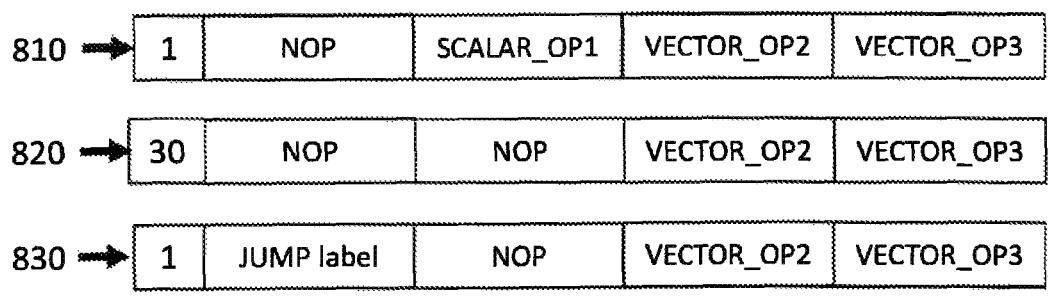
FIG. 8 illustrates an alternative method of representing a mix of scalar and vector atoms in VLIW instructions, according to the related art.

FIG. 8 illustrates an alternative method of representing a mix of scalar and vector atoms in VLIW instructions, according to the related art. In particular, FIG. 8 illustrates three VLIW instructions including a scalar VLIW instruction 810, a vector VLIW instruction 820 and a control VLIW instruction 830 which are included in a program (e.g., a software program).

As illustrated in the alternative of FIG. 8, one iteration of the vector atoms may be grouped with the scalar atoms. However, this alternative does not reduce the VLIW instruction count (i.e., three VLIW instructions are still required). In addition, this alternative produces a lost opportunity, in that the microarchitecture may not be able to group loads/stores to consecutive addresses because vector atoms are split across VLIW instructions.

Figure 9:
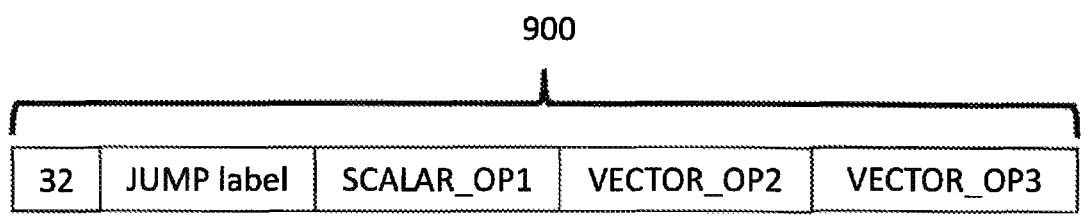
FIG. 9 illustrates a composite VLIW instruction 900, according to an exemplary aspect of the present invention.

FIG. 9 illustrates a composite VLIW instruction 900, according to an exemplary aspect of the present invention. The composite VLIW instruction 900 may solve the problems of conventional VLIW instructions. That is, in contrast to conventional VLIW instructions, the composite VLIW instruction 900 may be used to provide compact scalar and vector mix representation and control. More particularly, the composite VLIW instruction may efficiently combine scalar and temporal-vector instructions that have different issue cycles.

As illustrated in FIG. 9, the composite VLIW instruction 900 intelligently combines scalar, vector, and control VLIW instructions to keep the same semantics as before but without the disadvantages. In particular, the composite VLIW instruction 900 is a variable iteration instruction. That is, the number of iterations which the atoms of the composite VLIW instruction 900 are to be executed varies—some atoms (e.g., scalar atoms, and branch and control atoms) may be executed for a single iteration, whereas other atoms (e.g., vector atoms) may be executed for a number of iterations indicated by the value of the REPEAT field in the composite VLIW instruction 900.

The semantics of the composite VLIW instruction may be the same as the conventional VLIW instructions in FIGS. 7 and 8. However, to represent the four atoms (i.e., SCALAR_OP1, VECTOR_OP2, VECTOR_OP3, and JUMP label), only 1 composite VLIW instruction is required. Further, the NOP overhead has been completely eliminated, and it takes only 32 processor cycles to execute the four atoms, as compared to 34 processor cycles with the conventional VLIW instructions.

Referring back to FIG. 6, unlike a conventional processor core having a conventional VLIW instruction execution unit which performs the number of iterations in the REP field on all of the atoms in the VLIW instruction, the processor core 401*a* (and processor core 401*b*) includes a composite VLIW instruction execution unit 511.

Thus, as noted above, if the REP count>1 the VLIW instruction is executed by the composite VLIW instruction execution subunit 511*b* which:
1. Executes all scalar atoms at a single iteration;
2. Executes all vector atoms during all REP iterations; and
3. Executes all branch and control atoms at a single iteration.

Thus, the final executed instruction is a composite VLIW instruction including both scalar and vector operations.

In a particular embodiment, the composite VLIW instruction execution subunit 511*b* may execute all scalar atoms only at the first iteration, and may execute all branch and control atoms only at the final iteration. That is, the composite VLIW instruction execution subunit 511*b* may have a default setting in which all scalar atoms are executed only at the first iteration, and all branch and control atoms are executed only at the final iteration.

However, the composite VLIW instruction may include within the respective atoms a field indicating which iteration in which the atom is to be executed. For example, in the composite VLIW instruction 900 in FIG. 9, the SCALAR_OP1 atom may include a field indicating that the SCALAR_OP1 operation should be executed only in the fifth iteration (of the 32 total iterations) as opposed to the default setting (i.e., only in the first iteration).

It should be noted that the composite VLIW instruction may be created, for example, by a software programmer who is writing the program containing the composite VLIW instruction, or by a compiler which is compiling the program. Thus, in writing the program, the programmer or the compiler may insert the field into the atom (e.g., SCALAR_OP1) which indicates the iteration (e.g., first, second, last, etc.) in which the atom is to be executed.

Further, as illustrated in FIG. 6, the composite VLIW instruction execution unit 511 may include an iteration setting unit 511*c* which may adjust the default setting of the composite VLIW instruction execution unit 511, based on a user input. In particular, as illustrated in FIG. 6, the iteration setting unit 511c may get its input from the REP field of the VLIW instruction sent by the instruction unit 501 (which is input by the user/compiler). Thus, the user (or compiler) may cause the iteration setting unit 511c to adjust the default setting of the composite VLIW instruction execution unit 511 so that if the atom (e.g., SCALAR_OP1) does not include a field indicating the iteration in which the atom is to be executed, the composite VLIW instruction execution unit 511 will execute the atom at the new user-specified default iteration.

Figure 10:
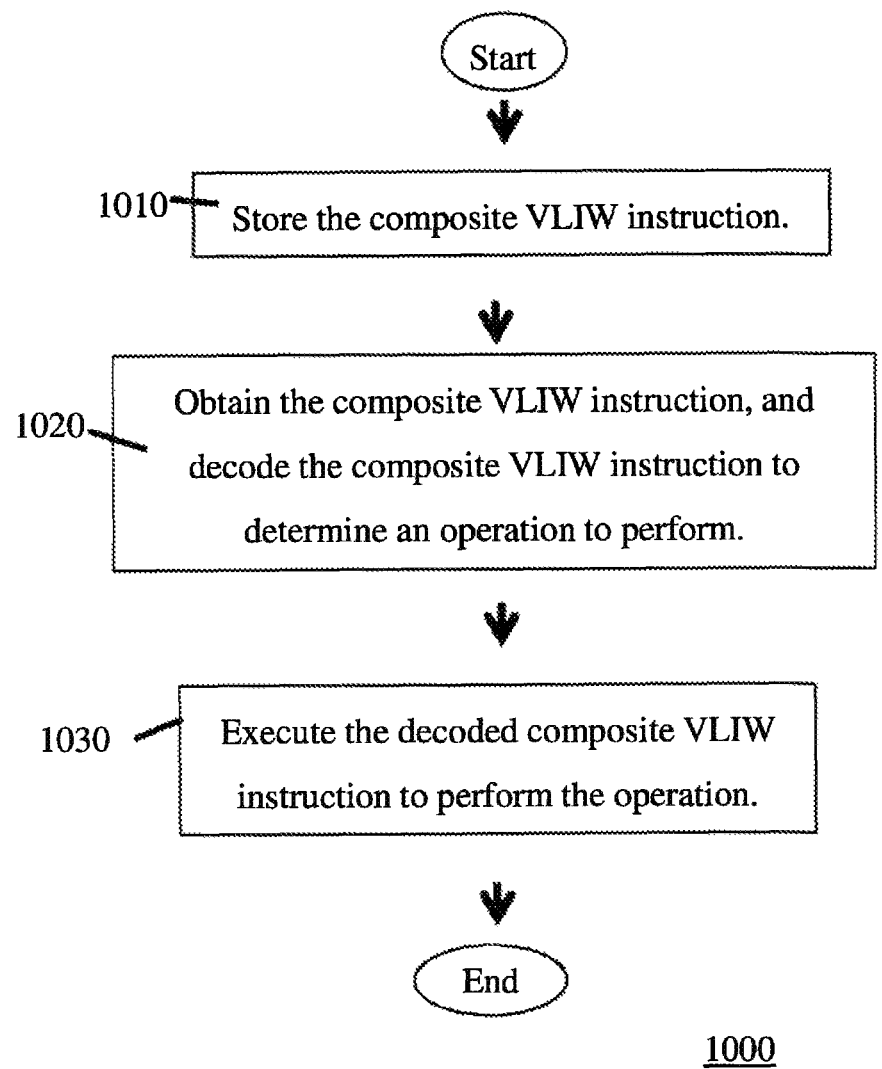
FIG. 10 illustrates a method 1000 of executing a composite very large instruction word (VLIW) instruction, according to an exemplary aspect of the present invention.

Referring again to the drawings, FIG. 10 illustrates a method 1000 of executing a composite very large instruction word (VLIW) instruction, according to an exemplary aspect of the present invention.

As illustrated in FIG. 10, the method 1000 includes storing (1010) the composite VLIW instruction, obtaining (1020) the composite VLIW instruction, and decoding the composite VLIW instruction to determine an operation to perform, and executing (1030) the decoded composite VLIW instruction to perform the operation.

Figure 11:
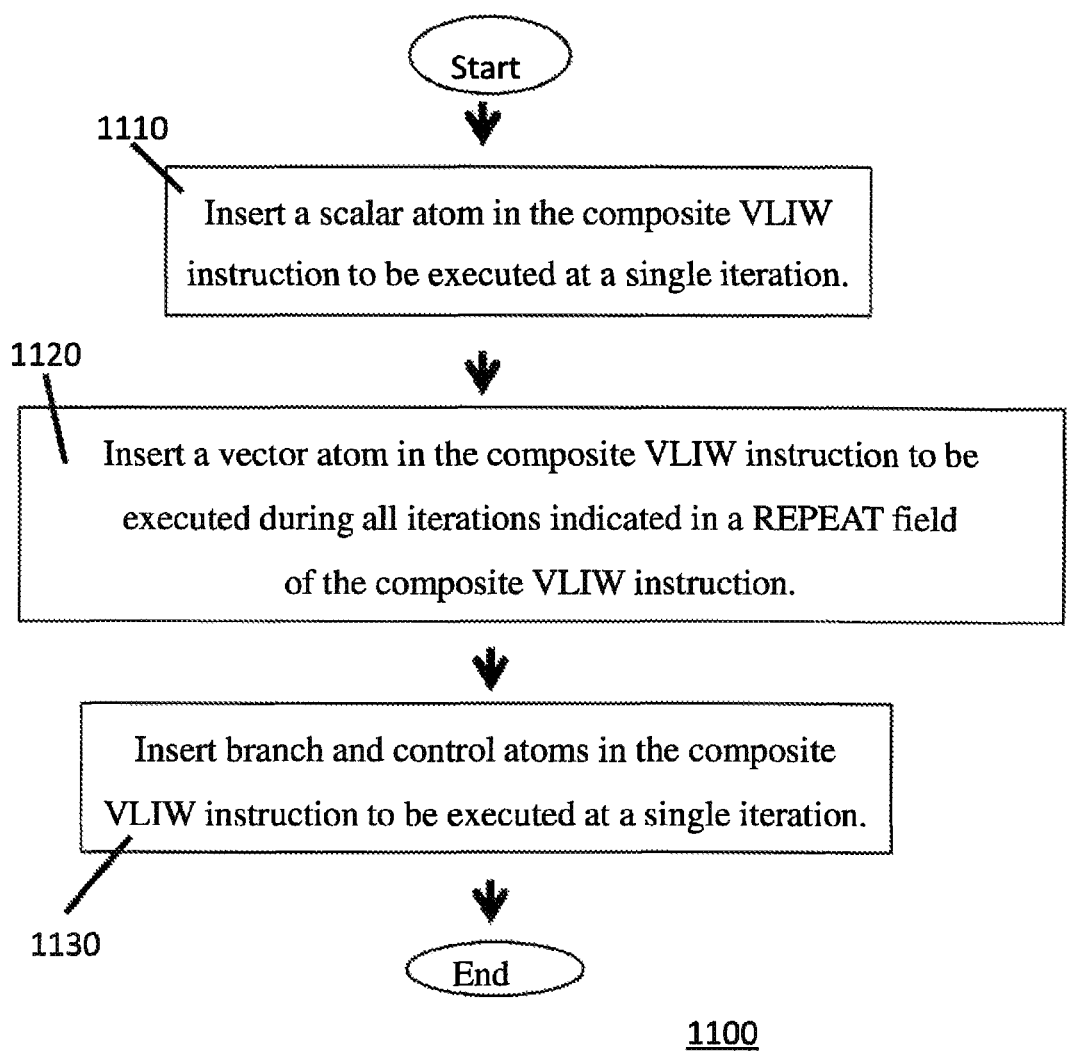
FIG. 11 illustrates a method 1100 of generating a composite VLIW instruction, according to an exemplary aspect of the present invention.

FIG. 11 illustrates a method 1100 of generating a composite VLIW instruction, according to an exemplary aspect of the present invention.

As illustrated in FIG. 11, the method 1100 includes inserting (1110) a scalar atom in the composite VLIW instruction to be executed at a single iteration, inserting (1120) a vector atom in the composite VLIW instruction to be executed during all iterations indicated in a REPEAT field of the composite VLIW instruction, and inserting (1130) branch and control atoms in the composite VLIW instruction to be executed at a single iteration. The method 1100 may also include inserting in the scalar atom a field indicating an iteration in which the scalar atom is to be executed, and inserting in the branch and control atoms a field indicating an iteration in which the branch and control atoms are to be executed.

The method 1100 may be performed, for example, by the processor core 401a. For example, the instruction unit 501 may detect scalar/vector atoms (or poorly formed VLIW instructions of prior art) and generate a composite VLIW instruction based on a result of the detection.

Some Advantages of the Exemplary Aspects of the Pes

Some of the many advantages of the exemplary aspects of the present invention over conventional processor cores, processors and methods will now be described.

Some conventional processors are designed to operate in a plurality of modes for processing vector and scalar instructions. That is, such conventional processors have distinct vector and scalar operation modes. An exemplary aspect of the present invention, on the other hand, may process both types of instructions (vector atoms and scalar atoms) in the same mode (e.g., simultaneously).

Some conventional VLIW machines may assume that each sub-instruction for a functional unit is scalar, i.e., each sub-instruction is issued for a single machine cycle. An exemplary aspect of the present invention, on the other hand, may include a machine where a sub-instruction may be issued for multiple machine cycles based on the repeat count. In particular, at each issue cycle of the sub-instruction a separate element of a vector register may be processed. It is only in such a scenario that it becomes important to combine a mix of scalar, vector, and control VLIW sub-instructions to prevent an explosion of VLIW code.

Other conventional devices may include hardware that automatically fetches a mix of scalar and vector instructions for a processor's functional units. Each instruction, including vector instructions, are processed in a single machine cycle. A vector instruction executes an operation on all elements of a vector register simultaneously, i.e., in a single cycle. This makes it trivial to mix scalar and vector instructions since they are both issued for a single cycle only.

In contrast, in an exemplary aspect of the present invention, a vector instruction is not necessarily processed in a single cycle; only one element of the vector register is processed in a single machine cycle. To execute the entire vector instruction, the operation must be issued several times (e.g., equal to the length of the vector register, or less than a length of the vector register in the case were the user wants to add a portion of the elements of the vector register) to process every element of the vector register. The length of the vector is any integer between 1 and some maximum length defined by the implementation. This may have many advantages (used to hide latency, reduce data bandwidth requirements, reduce power and area requirements). In contrast, a scalar instruction operates on a scalar value which has by definition a single element and therefore requires only a single issue. It is when these types of vector instructions with scalar instructions with different issue cycles are mixed that the problem of efficiently representing them in VLIW instructions may be encountered.

Still other conventional devices do not deal with the case of generating efficient instructions from scalar and temporal-vector instructions that each have different numbers of issue cycles. Such devices will have to generate the inefficient code as described above in the Background section. However, by using an intelligent mechanism to combine scalar and temporal-vector instructions, the exemplary aspects of the present invention may generate more efficient VLIW code as compared to these conventional devices.

Still other conventional devices deal with a scheduling technique for loops called software pipelining. Software pipelining is a method to efficiently execute instructions within a loop. The generated code contains a loop body and setup (prologue) and teardown (epilogue) sections. Each of these three sections may contain multiple VLIW instructions. Such conventional devices may address how the epilogue and prologue of the software pipelined loop can be efficiently represented using special hardware called a register complex. However, the devices do not address how a single VLIW instruction with a mix of scalar and vector sub-instructions can be efficiently implemented.

Computer Program Product

Referring again to FIGS. 4-6 and 9-13, another aspect of the present invention is directed to a computer program product which may include, for example, a computer readable storage medium (hereinafter, the "storage medium") that may store computer readable program instructions (hereinafter, the "computer program" or "instructions") for performing the features and functions of the processor 400, the processor core 401a, the method 1000 or the method 1100. That is, the storage medium may store the instructions thereon for causing a processing device (e.g., computer, instruction execution device, computing device, computer processor, central processing unit (CPU), microprocessor, etc.) to perform a feature or function of the present invention.

The storage medium can be a tangible device that can retain and store the instructions for execution by the processing device. The storage medium may be, for example, but is not limited to, an electronic storage device, a magnetic storage device, an optical storage device, an electromagnetic storage device, a semiconductor storage device, or any suitable combination of the foregoing.

A non-exhaustive list of more specific examples of the storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

The storage medium, as used herein, should not be construed as merely being a "transitory signal" such as a radio wave or other freely propagating electromagnetic wave, an electromagnetic wave propagating through a waveguide or other transmission media (e.g., light pulses passing through a fiber-optic cable), or an electrical signal transmitted through a wire.

The processing device can access the instructions on the storage medium. Alternatively, the processing device can access (e.g., download) the instructions from an external computer or external storage device via a network such as the Internet, a local area network, a wide area network and/or a wireless network.

The network may include, for example, copper transmission cables, optical transmission fibers, wireless transmission, routers, firewalls, switches, gateway computers and/or edge servers. For example, the processing device may include a network adapter card or network interface which receives the instructions from the network and forwards the instructions to the storage medium within the processing device which stores the instructions.

The instructions for performing the features and functions of the present invention may include, for example, assembler instructions, instruction-set-architecture (ISA) instructions, machine instructions, machine dependent instructions, microcode, firmware instructions, state-setting data, or either source code or object code written in one or more programming languages (or combination of programming languages), including an object oriented programming language such as Java, Smalltalk, C++ or the like, and conventional procedural programming languages, such as the "C" programming language or similar programming languages.

The instructions may execute entirely on the processing device (e.g., a user's computer), partly on the processing device, as a stand-alone software package, partly on the processing device and partly on a remote computer or entirely on the remote computer or a server. For example, the instructions may execute on a remote computer which is connected to the processing device (e.g., user's computer) through a network such as a local area network (LAN) or a wide area network (WAN), or may execute on an external computer which is connected to the processing device through the Internet using an Internet Service Provider.

The processing device may include, for example, electronic circuitry including, for example, programmable logic circuitry, field-programmable gate arrays (FPGA), or programmable logic arrays (PLA) that may execute the instructions by utilizing state information of the instructions to personalize the electronic circuitry, in order to perform a feature or function of the present invention.

It should be noted that the features and functions of the present invention which are described above with reference to FIGS. 4-6 and 9-13 may be implemented by the processing device executing the instructions. That is, each block of the flowchart illustrations and/or block diagrams, and combinations of blocks in the flowchart illustrations and/or block diagrams, can be implemented by processing device executing the instructions.

The instructions (e.g., composite VLIW instruction 900) may be provided to a processor (e.g., processor 400) of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

That is, the instructions may be executed by a processing device to cause a series of operational steps to be performed by the processing device to produce a computer-implemented process, so that the executed instructions implement the features/functions/acts described above with respect to the flowchart and/or block diagram block or blocks of FIGS. 4-6 and 9-13.

Thus, the flowchart and block diagrams in the FIGS. 4-6 and 9-13 illustrate not only a method, system, apparatus or device, but also illustrate the architecture, functionality, and operation of the processing device executing the instructions. In this regard, each block in the flowchart or block diagrams may represent a module, segment, or portion of the instructions, which comprises one or more executable instructions for implementing the specified logical function(s). In some alternative implementations, the features or functions in the block may occur out of the order noted in the figures.

For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Cloud Computing and the Exemplary Aspects of the Present Invention

Figure 12:
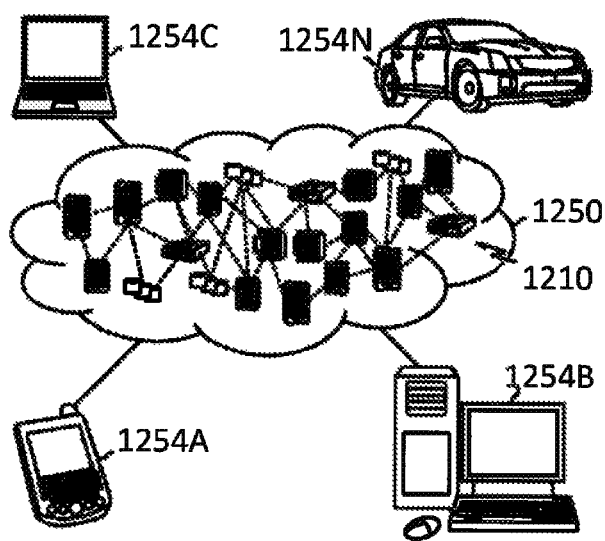
FIG. 12 depicts a cloud computing environment according to an embodiment of the present invention.
Figure 13:
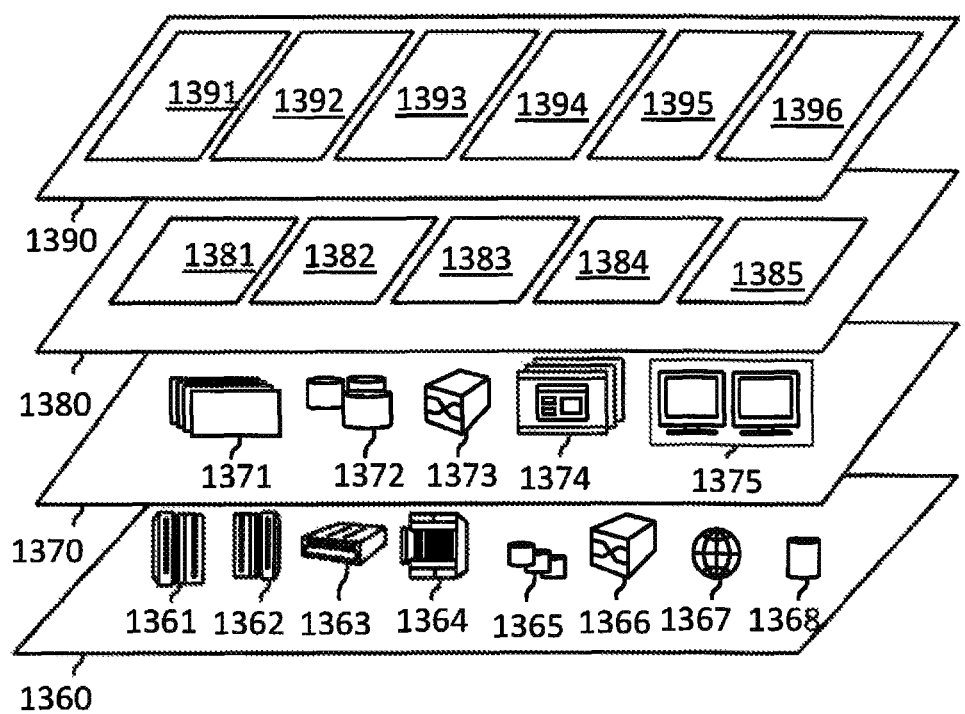
FIG. 13 depicts abstraction model layers according to an embodiment of the present invention.

Referring again to the drawings, FIGS. 12-13 illustrate other exemplary aspects of the present invention.

It is to be understood that although this disclosure includes a detailed description on cloud computing, implementation of the teachings recited herein are not limited to a cloud computing environment. Instead, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

1. Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

2. Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

3. Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 12, illustrative cloud computing environment 1250 is depicted. As shown, cloud computing environment 1250 includes one or more cloud computing nodes 1210 with which local computing devices used by cloud consumers, such as, for example, personal digital assistant (PDA) or cellular telephone 1254A, desktop computer 1254B, laptop computer 1254C, and/or automobile computer system 1254N may communicate. Nodes 1210 may communicate with one another. They may be grouped (not shown) physically or virtually, in one or more networks, such as Private, Community, Public, or Hybrid clouds as described hereinabove, or a combination thereof.

This allows cloud computing environment 1250 to offer infrastructure, platforms and/or software as services for which a cloud consumer does not need to maintain resources on a local computing device. It is understood that the types of computing devices 1254A-N shown in FIG. 12 are intended to be illustrative only and that computing nodes 1210 and cloud computing environment 1250 can communicate with any type of computerized device over any type of network and/or network addressable connection (e.g., using a web browser).

Referring now to FIG. 13, a set of functional abstraction layers provided by cloud computing environment 1250 (FIG. 12) is shown. It should be understood in advance that the components, layers, and functions shown in FIG. 13 are intended to be illustrative only and embodiments of the invention are not limited thereto. As depicted, the following layers and corresponding functions are provided:

Hardware and software layer 1360 includes hardware and software components. Examples of hardware components include: mainframes 1361; RISC (Reduced Instruction Set Computer) architecture based servers 1362; servers 1363; blade servers 1364; storage devices 1365; and networks and networking components 1366. In some embodiments, software components include network application server software 1367 and database software 1368.

Virtualization layer 1370 provides an abstraction layer from which the following examples of virtual entities may be provided: virtual servers 1371; virtual storage 1372; virtual networks 1373, including virtual private networks; virtual applications and operating systems 1374; and virtual clients 1375.

In one example, management layer 1380 may provide the functions described below. Resource provisioning 1381 provides dynamic procurement of computing resources and other resources that are utilized to perform tasks within the cloud computing environment. Metering and Pricing 1382 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1383 provides access to the cloud computing environment for consumers and system administrators.

Service level management 1384 provides cloud computing resource allocation and management such that required service levels are met. Service Level Agreement (SLA) planning and fulfillment 1385 provide pre-arrangement for, and procurement of, cloud computing resources for which a future requirement is anticipated in accordance with an SLA.

Workloads layer 1390 provides examples of functionality for which the cloud computing environment may be utilized. Examples of workloads and functions which may be provided from this layer include: mapping and navigation 1391; software development and lifecycle management 1392; virtual classroom education delivery 1393; data analytics processing 1394; transaction processing 1395; and generating a composite VLIW instruction and/or executing a composite VLIW instruction 1396.

With its unique and novel features, the present invention provides a processor core, processor, method for generating a composite VLIW instruction, and method of executing a composite VLIW instruction which are more effective and more efficient than conventional processor cores, processors and methods.

While the invention has been described in terms of one or more embodiments, those skilled in the art will recognize that the invention can be practiced with modification within the spirit and scope of the appended claims. Specifically, one of ordinary skill in the art will understand that the drawings herein are meant to be illustrative, and the design of the inventive method and system is not limited to that disclosed herein but may be modified within the spirit and scope of the present invention.

Further, Applicant's intent is to encompass the equivalents of all claim elements, and no amendment to any claim the present application should be construed as a disclaimer of any interest in or right to an equivalent of any element or feature of the amended claim.

What is claimed is:

1. A processor core comprising:
a memory which stores multiple composite very large instruction word (VLIW) instructions;
an instruction circuit which obtains the multiple composite VLIW instructions from the memory and decodes the multiple composite VLIW instructions to determine an operation to perform; and
a composite VLIW instruction execution unit which executes the multiple composite VLIW instructions to perform the operation, wherein the composite VLIW instruction execution unit comprises a detector circuit which determines whether a respective REPEAT (REP) field in each of the multiple composite VLIW instructions is REP=1 or REP>1,
wherein the multiple composite VLIW instructions comprise a first composite VLIW instruction and a second composite VLIW instruction,
wherein in response to the detector circuit determining that the REP field in the first composite VLIW instruction is REP=1, the composite VLIW instruction execution unit executes each atom in the first composite VLIW instruction at a single iteration, and
wherein in response to the detector circuit determining that the REP field in the second composite VLIW instruction comprises a value of REP>1, the composite VLIW instruction execution unit executes each vector atom of the second composite VLIW instruction for a number of iterations greater than one that is equal to the value of the REP field and executes each scalar atom of the second composite VLIW instruction for a single iteration.

2. The processor core of claim 1, wherein the first composite VLIW instruction includes a scalar atom, and
wherein the composite VLIW instruction execution unit includes a default setting which sets an iteration at which the scalar atom of the first composite VLIW instruction is to be executed.

3. The processor core of claim 2, wherein the scalar atom of the first composite VLIW instruction indicates an iteration at which the scalar atom of the first composite VLIW instruction is to be executed.

4. The processor core of claim 3, wherein the first composite VLIW instruction further comprises a vector atom and a control atom,
wherein each scalar atom indicates an iteration at which the respective scalar atom is to be executed instead of the iteration set by the default setting.

5. The processor core of claim 1, wherein the composite VLIW instruction execution unit further comprises a composite VLIW instruction execution subunit that executes each scalar atom of the second composite VLIW instruction at a respective single iteration.

6. The processor core of claim 5, wherein the composite VLIW instruction execution subunit executes branch and control atoms of the second composite VLIW instruction at a single iteration.

7. The processor core of claim 6, wherein the single iteration at which the composite VLIW instruction execution subunit executes the branch and control atoms of the second composite VLIW instruction comprises a last iteration.

8. The processor core of claim 6, wherein the branch and control atoms of the second composite VLIW instruction comprise a field indicating the iteration at which the composite VLIW instruction execution subunit executes the branch and control atoms.

9. The processor core of claim 6, wherein the composite VLIW instruction execution unit comprises an iteration setting circuit which, based on a user input:
adjusts a first default setting that sets an iteration at which the branch and control atoms of the second composite VLIW instruction are executed; and
adjusts a second default setting that sets an iteration at which each scalar atom of the second composite VLIW instruction is to be executed.

10. The processor core of claim 5, wherein the composite VLIW instruction execution subunit executes a first scalar atom of multiple scalar atoms of the second composite VLIW instruction at a first iteration that precedes at least one other iteration.

11. The processor core of claim 10, wherein the first scalar atom of the second composite VLIW instruction comprises a field indicating the iteration at which the composite VLIW instruction execution subunit executes the first scalar atom, and wherein the first scalar atom and a vector atom are combined in the second composite VLIW instruction.

12. A method of executing multiple composite very large instruction word (VLIW) instructions, the method comprising:
storing in a memory, the multiple composite VLIW instructions, wherein the multiple composite VLIW instructions comprise a first composite VLIW instruction and a second composite VLIW instruction;
obtaining the multiple composite VLIW instructions from the memory and decoding the multiple composite VLIW instructions to determine an operation to perform; and
using a composite VLIW instruction execution unit, executing the multiple composite VLIW instructions to perform the operation, wherein the composite VLIW instruction execution unit comprises a detector circuit which determines whether a respective REPEAT (REP) field in each of the multiple composite VLIW instructions is REP=1 or REP>1, and
wherein in response to the detector circuit determining that the REP field in the first composite VLIW instruction is REP=1, the composite VLIW instruction execution unit executes each atom in the first composite VLIW instruction at a single iteration, and
wherein in response to the detector circuit determining that the REP field in the second composite VLIW instruction comprises a value of REP>1, the composite VLIW instruction execution unit executes each vector atom of the second composite VLIW instruction for a number of iterations greater than one that is equal to the value of the REP field and executes each scalar atom of the second composite VLIW instruction for a single iteration.

13. The method of claim 12, wherein the first composite VLIW instruction includes a scalar atom, and
wherein the composite VLIW instruction execution unit includes a default setting which sets an iteration at which the scalar atom of the first composite VLIW instruction is to be executed.

14. The method of claim 13, wherein the scalar atom of the first composite VLIW instruction indicates an iteration at which the scalar atom of the first composite VLIW instruction is to be executed.

15. The method of claim 12, further comprising:
executing branch and control atoms of the second composite VLIW instruction at a single iteration,
wherein each scalar atom indicates an iteration at which the respective scalar atom is to be executed instead of the iteration set by a default setting in the composite VLIW instruction execution unit.

16. A programmable non-transitory storage medium tangibly embodying a program of machine-readable instructions executable by a digital processing apparatus to perform a method of executing multiple composite very large instruction word (VLIW) instructions, the method comprising:
storing in a memory, the multiple composite VLIW instructions, wherein the multiple composite VLIW instructions comprise a first composite VLIW instruction and a second composite VLIW instruction;
obtaining the multiple composite VLIW instructions from the memory and decoding the multiple composite VLIW instructions to determine an operation to perform; and
using a composite VLIW instruction execution unit, executing the multiple composite VLIW instructions to perform the operation, wherein the composite VLIW instruction execution unit comprises a detector circuit which determines whether a respective REPEAT (REP) field in each of the multiple composite VLIW instructions is REP=1 or REP>1,
wherein in response to the detector circuit determining that the REP field in the first composite VLIW instruction is REP=1, the composite VLIW instruction execution unit executes each atom in the first composite VLIW instruction at a single iteration, and
wherein in response to the detector circuit determining that the REP field in the second composite VLIW instruction comprises a value of REP>1, the composite VLIW instruction execution unit executes each vector atom of the second composite VLIW instruction for a number of iterations greater than one that is equal to the value of the REP field and executes each scalar atom of the second composite VLIW instruction for a single iteration.

17. The programmable storage medium of claim 16, wherein the first composite VLIW instruction includes a scalar atom, and
wherein the composite VLIW instruction execution unit includes a default setting which sets an iteration at which the scalar atom of the first composite VLIW instruction is to be executed.

18. The programmable storage medium of claim 17, wherein the scalar atom of the first composite VLIW instruction indicates an iteration at which the scalar atom of the first composite VLIW instruction is to be executed.

19. The programmable storage medium of claim 17, wherein the method further comprises executing branch and control atoms of the second composite VLIW instruction at a single iteration, and
wherein each of the branch and control atoms indicates an iteration at which the respective branch and control atom is to be executed instead of an iteration set by the default setting.

* * * * *